US012664963B2

(12) United States Patent
Stecenko et al.

(10) Patent No.: US 12,664,963 B2
(45) Date of Patent: Jun. 23, 2026

(54) ACOUSTIC ARTICLE

(71) Applicant: 3M INNOVATIVE PROPERTIES COMPANY, St. Paul, MN (US)

(72) Inventors: Tatjana Stecenko, Toronto (CA); Olester Benson, Jr., Woodbury, MN (US); Tongyang Shi, Woodbury, MN (US); Pingfan Wu, Woodbury, MN (US); James M. Jonza, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 166 days.

(21) Appl. No.: 18/288,468

(22) PCT Filed: Apr. 20, 2022

(86) PCT No.: PCT/IB2022/053702
§ 371 (c)(1),
(2) Date: Oct. 26, 2023

(87) PCT Pub. No.: WO2022/229796
PCT Pub. Date: Nov. 3, 2022

(65) Prior Publication Data
US 2024/0212661 A1     Jun. 27, 2024

Related U.S. Application Data

(60) Provisional application No. 63/182,486, filed on Apr. 30, 2021.

(51) Int. Cl.
*G10K 11/162*     (2006.01)
*B29C 59/04*     (2006.01)
(Continued)

(52) U.S. Cl.
CPC .......... *G10K 11/162* (2013.01); *B29C 59/046* (2013.01); *G10K 11/172* (2013.01);
(Continued)

(58) Field of Classification Search
CPC .. G10K 11/162; G10K 11/172; B29C 59/046; B29K 2101/10; B29K 2995/0046; B29K 2995/0063; B29K 2995/0097
See application file for complete search history.

(56) References Cited

U.S. PATENT DOCUMENTS 6,576,333 B2     6/2003   Sheng et al.
8,025,124 B2 *   9/2011   Levit ....................... F16F 7/108
                                            181/284
(Continued)

FOREIGN PATENT DOCUMENTS

DE     102015103936 A1     9/2016
WO     2020003133 A1       1/2020
WO     2020196910 A1       10/2020

OTHER PUBLICATIONS

International Search report for PCT International Application No. PCT/IB2022/053702, mailed on Jun. 30, 2022, 5 pages.
Kurtze, "Light-Weight Walls with High Transmission Loss", Journal of the Acoustical Society of America, 1959, vol. 9, No. 6, pp. 441-445.
Langfeldt, "An Efficient Analytical Model for Baffled, Multi-Celled Membrane-Type Acoustic Metamaterial Panels", Journal of Sound and Vibration, 2018, vol. 417, pp. 359-375.

*Primary Examiner* — Forrest M Phillips
(74) *Attorney, Agent, or Firm* — Carlos M. Téllez Rodríguez; 3M Innovative Properties Co

(57)     ABSTRACT

Provided is an acoustic article and related methods of manufacture and use. The acoustic article includes a continuous layer having a first elastic stiffness, and a plurality of distributed masses disposed on a major surface of the continuous layer having a second elastic stiffness. The second elastic stiffness can be less than the first elastic stiffness to provide an acoustic metamaterial displaying an anti-resonance peak at a frequency below 800 Hz. The
(Continued)

acoustic article can be made using efficient and scalable processes for manufacturing low frequency acoustic barrier materials.

18 Claims, 4 Drawing Sheets

(51) Int. Cl.
| | | |
|---|---|---|
| *B29K 101/10* | (2006.01) | |
| *B29L 31/00* | (2006.01) | |
| *G10K 11/172* | (2006.01) | |

(52) U.S. Cl.
CPC .. *B29K 2101/10* (2013.01); *B29K 2995/0046* (2013.01); *B29K 2995/0063* (2013.01); *B29K 2995/0097* (2013.01); *B29L 2031/721* (2013.01)

(56) References Cited

U.S. PATENT DOCUMENTS

| | | | |
|---|---|---|---|
| 8,579,073 B2 | 11/2013 | Sheng et al. | |
| 8,857,563 B1 * | 10/2014 | Chang | G10K 11/172 |
| | | | 181/286 |
| 8,960,365 B2 | 2/2015 | Sheng et al. | |
| 9,270,253 B2 | 2/2016 | Chang et al. | |
| 2021/0039361 A1 * | 2/2021 | Koshitouge | B32B 25/08 |
| 2022/0028363 A1 | 1/2022 | Koshitouge et al. | |

OTHER PUBLICATIONS

Langfeldt, "Analytical Model for Low-Frequency Transmission Loss Calculation of Membranes Loaded with Arbitrarily Shaped Masses", Journal of Sound and Vibration, 2015, vol. 349, pp. 315-329.

Langfeldt, "Improved Sound Transmission Loss of Glass Wool with Acoustic Metamaterials", Proceedings of the 26th International Congress on Sound & Vibration, Montréal, Jul. 2019, pp. 1-9.

Langfeldt, "Membrane- And Plate-Type Acoustic Metamaterials with Elastic Unit Cell Edges", Journal of Sound and Vibration, 2019, vol. 453, pp. 65-86.

Langfeldt, 11th International Styrian Noise, Vibration and Harshness Congress: The European Automotive Noise Conference. Society of Automotive Engineers paper 2020-01-1652 to be published, ISSN: 0148-7191.

Slesarenko, "Towards Mechanical Characterization of Soft Digital Materials for Multimaterial 3D-Printing" International Journal of Engineering Science, 2018, vol. 123, pp. 62-72.

Zhang, "Broadband Membrane-Type Acoustic Metamaterial Structures with Polymorphic Anti-Resonance Modes", AE international, 2019-01-1574.

Zhou, "Broadband Low-Frequency Membrane-Type Acoustic Metamaterials with Multi-State Anti-Resonances", Applied Acoustics, 2020, vol. 159, pp. 107078/1- 107078/11.

* cited by examiner

ACOUSTIC ARTICLE

CROSS REFERENCE TO RELATED APPLICATIONS

This application is a national stage filing under 35 U.S.C. 371 of PCT/IB2022/053702, filed Apr. 20, 2022, which claims the benefit of U.S. Provisional Patent Application No. 63/182,486, filed Apr. 30, 2021, the disclosure of which is incorporated by reference in its/their entirety herein.

FIELD OF THE INVENTION

Provided herein are acoustic articles and related methods of manufacture and use. The acoustic articles can be, for example, acoustic metamaterial barriers.

BACKGROUND

Noise pollution is generally defined as regular exposure to elevated sound levels that may lead to adverse effects in humans or other living organisms. While sound levels of less than 70 dB may not be damaging to living organisms, extended exposure to noise exceeding 85 dB may be hazardous. Sources of noise are diverse and widespread, and include traffic noise, motor vehicle noise, aircraft noise, construction sites, and even noise from social gatherings.

Various technologies have been explored to mitigate noise pollution. Some of these include acoustic absorbers and barriers and related articles that absorb or reflect noise. The effectiveness of these noise shielding solutions, however, tend to be limited by the mass of the shielding material. This is because noise transmission is generally governed by the mass law, which states that sound insulation provided by a solid barrier will increase by approximately 5-6 dB per doubling of mass. Thus, increasing the sound reduction characteristics of an acoustic article generally requires increasing its thickness or density, which adds weight and size to the barrier.

SUMMARY

Distributed mass acoustical metamaterials, also called decorated membranes, include mass elements capable of vibrating out of phase with a substrate, such as a film, on which it is applied. These anti-resonance structures can display acoustic article properties exceeding the transmission loss predicted by mass law, at least in the frequency regions of the anti-resonance bands.

It was discovered that the above anti-resonance behavior displays an unusual dependence on the stiffness of the masses on the decorated membrane, which can in turn be dependent on its mass, shape and location. If the stiffness of the mass is less than the stiffness of the substrate, then the anti-resonance peak can be shifted to a lower frequency as the mass stiffness is reduced. By contrast, if the mass is the same stiffness, or is stiffer than the substrate, then the resonance peak might not be influenced by the mass stiffness. Based on these observations, it is possible to provide an acoustic article based on a composite with enhanced anti-resonance properties. Such composites can also be made using efficient and scalable processes for manufacturing these low frequency barrier materials at a reasonable cost.

In a first aspect, an acoustic article is provided. The acoustic article comprises: a continuous layer having a first elastic stiffness; and a plurality of distributed masses disposed on a major surface of the continuous layer having a second elastic stiffness, wherein the second elastic stiffness is less than the first elastic stiffness, and wherein the acoustic article is an acoustic metamaterial displaying an anti-resonance peak at a frequency below 800 Hz.

In a second aspect, an acoustic article is provided comprising: a continuous layer having a first elastic modulus; and a plurality of distributed masses disposed on a major surface of the continuous layer having a second elastic modulus, wherein the second elastic modulus is less than the first elastic modulus, and wherein the acoustic article is an acoustic metamaterial displaying an anti-resonance peak at a frequency below 800 Hz.

In a third aspect, a method of making the acoustic article is provided, the method comprising: providing a molding surface having a plurality of defined recesses; applying to the molding surface a reactive monomer mixture that at least partially fills the plurality of defined recesses; and disposing the continuous layer on the reactive monomer mixture; removing at least some excess reactive monomer mixture between the continuous layer and the molding surface; curing the reactive monomer mixture while it is contacting the continuous layer to couple the plurality of distributed masses to the continuous layer; and optionally, removing the continuous layer and plurality of distributed masses from the molding surface.

In a fourth aspect, a method of making an acoustic article is provided, the method comprising: embossing a flat film to provide a molding surface comprising a plurality of defined recesses; applying to the molding surface a reactive monomer mixture that at least partially fills the plurality of defined recesses; removing at least some excess reactive monomer mixture above the molding surface; curing the reactive monomer mixture to obtain a plurality of distributed masses adhered to the molding surface.

In a fifth aspect, a method of making an acoustic article is provided, the method comprising: shaping a flat polymeric film to provide a molding surface comprising a plurality of defined recesses; applying a first reactive monomer mixture to the molding surface to at least partially fill the plurality of defined recesses; and removing at least some excess reactive monomer mixture above the molding surface; curing the first reactive monomer mixture to provide a plurality of distributed masses; applying to the plurality of distributed masses a second reactive monomer mixture; curing the second reactive monomer mixture to provide a continuous layer adhered to the plurality of distributed masses; and optionally, removing the continuous layer and plurality of distributed masses from the molding surface.

In a sixth aspect, an acoustic article is provided, the acoustic article made according to any of the foregoing methods.

Figure 1:
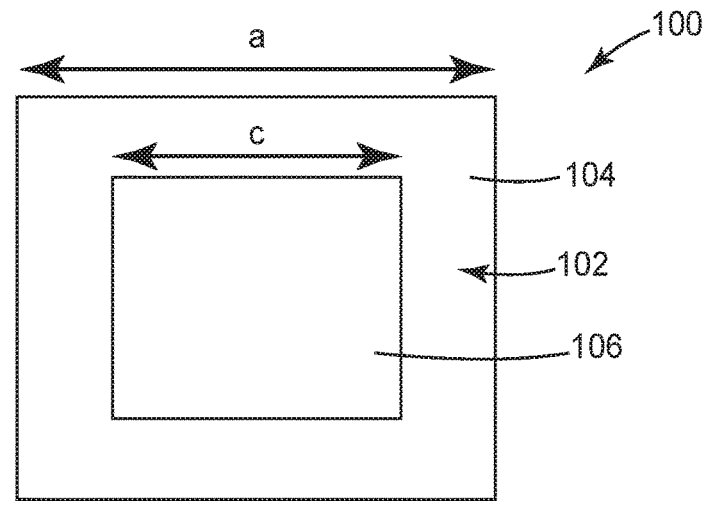
FIG. 1 is a plan view of an acoustic article according to one exemplary embodiment.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

"ambient conditions" means at 21° C. and 101.3 kPa pressure;

"cure" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"curable" means capable of being cured;

"elastic modulus" refers to the ratio of the stress shape increment to the strain shape increment in tension, such as measured according to ASTM D882-18 (2018).

"fully cured" means cured to a state where the composition is suitable for use in its intended application, such as a substantially cured state;

"partially cured" means cured to a state that is less than fully cured;

"polymer" refers to a molecule having at least one repeating unit;

"substantially" means to a significant degree, as in an amount of at least 50%, 60, 70, 80, 90, 95, 96, 97, 98, 99, 99.5, 99.9, 99.99, or 99.999%, or 100%; and "thickness" means the distance between opposing sides of a layer or multilayered article.

DETAILED DESCRIPTION

As used herein, the terms "preferred" and "preferably" refer to embodiments described herein that can afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises", and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and if so, are from the perspective observed in the particular drawing.

These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described relating to the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

Figure 2:
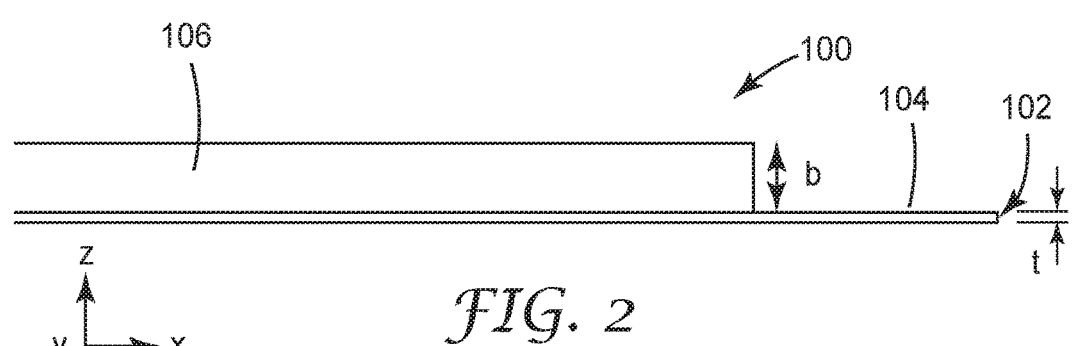
FIG. 2 is a side elevational view of the acoustic article of FIG. 1.

A fragmentary view of an acoustic article according to one exemplary embodiment is shown in FIGS. 1 and 2 from a plan view and side view, respectively, with the acoustic article hereinafter represented by the numeral 100. In a preferred embodiment, the acoustic article 100 acts as an acoustic barrier. Applications for these acoustic barriers are not limited and can include, for example, vehicular door panels and machinery enclosures, and aircraft fuselages. These articles can be used in thermal and acoustic insulation, optionally in combination with foam or fiberglass absorbers, either between layers or as an outer layer. When used as part of an interior panel acoustic treatment, these materials may be used in combination with non-woven acoustic absorbers. These articles can also be used in acoustic curtains, which can be deployed in aerospace and industrial applications.

FIG. 1 represents a unit cell of the acoustic article 100, which extends along the x-y plane. It is to be understood that this unit cell can be replicated to any extent along the x-y plane. Such replication can provide an acoustic article having any suitable area, shape, or size along this plane.

In this simplified example, the acoustic article 100 includes a continuous layer 102 having a major surface 104 facing upwards in FIG. 2. An exemplary mass 106 is disposed on the major surface 104. The mass 106 is rectilinear in shape and protrudes outwardly from the major surface 104 along the z-direction, as shown in FIG. 2. As viewed from above, the mass 106 extends over a square area, with each side of the square having length dimension "c." The continuous layer 102, in this unit cell, also extends over a square area, with each side of the square having a length dimension "a." The mass 106 thus covers an area of $c^2$, representing a fraction $c^2/a^2$ of the overall area of the major surface 104. The unit cell as shown in FIG. 1 is merely an example, and other unit cells that are rectangular, triangular, or hexagonal in shape are also possible.

Useful anti-resonant properties can be achieved, for example, when the masses 106 extend over from 5 percent to 80 percent, from 10 percent to 70 percent, from 15 percent to 60 percent, or in some embodiments, less than, equal to, or greater than 5 percent, 6, 7, 8, 9, 10, 12, 15, 17, 20, 25, 30, 35, 40, 45, 50, 55, 60, 65, 70, 75, or 80 percent of the overall area of the major surface 104.

Referring again to FIG. 2, the mass 106 is shown having a thickness "b" while the continuous layer 102 is shown having a thickness "t." In cases where there is variability in thickness, the dimensions b and t can represent average thicknesses of the masses 106 and continuous layer 102 across the major surface 104, respectively. It is generally desirable for thickness t to be small relative to the thickness b to impart flexibility to the overall acoustic article 100 and enable vibration of the mass 106 sufficient to achieve desired anti-resonance properties in the system. The thickness t can be from 2.5 percent to 100 percent, from 5 percent to 90 percent, from 10 percent to 80 percent, or in some embodiment, less than, equal to, or greater than 2.5 percent, 3, 3.5, 4, 5, 7, 10, 12, 15, 17, 20, 25, 30, 35, 40, 45, 50, 55, 60, 65, 70, 75, 80, 85, 90, 95, or 100 percent of the thickness b.

The thickness b of the mass 106 can be in the range of from 500 micrometers to 2000 micrometers, or in some embodiments, less than, equal to, or greater than 500 micrometers, 550, 600, 650, 700, 750, 800, 850, 900, 950, 1000, 1100, 1200, 1300, 1400, 1500, 1600, 1700, 1800, 1900, or 2000 micrometers. The thickness t of the continuous layer 102 can be in the range of from 50 micrometers to 2000 micrometers, or in some embodiments, less than, equal to, or greater than 50 micrometers, 60, 70, 80, 90, 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, or 2000 micrometers.

In accordance with the unit cell depicted in FIGS. 1 and 2, the overall acoustic article 100 may be composed of one unit cell or a plurality of unit cells containing corresponding masses 106 that are evenly distributed along the major surface 104 of the continuous layer 102. Here, the distributed masses 106 are arranged in a two-dimensional replicated pattern along the major surface 104, but this need not be the case. In an alternative embodiment, the masses 106 are not located in pre-determined positions but rather are randomly or semi-randomly distributed across the major surface 104.

In the acoustic article 100, the distributed masses 106 are discrete—that is, each mass 106 is physically spaced apart from its neighboring masses 106. In alternative embodiments, and depending on the method used to manufacture the acoustic article 100, the distributed masses 106 could also be interconnected by a relatively thin web (i.e., base layer) of material. Optionally, this base layer is integral with the distributed masses 106 and have the same composition.

In a preferred embodiment, the continuous layer 102 and the distributed masses 106 are comprised of a first polymer and second polymer, respectively. In some embodiments, the first and second polymers are selected to have significantly different mechanical properties. Either of the distributed masses 106 and continuous layer 102 can independently be made from a wide variety of materials, including metals, polymers, ceramics, and composite materials. Regarding useful polymers, either of the distributed masses 106 and continuous layer 102 can independently be made from a poly(meth)acrylate, polyalkylene, polyalkylene oxide, polyester, polycarbonate, polyurethane, polyamide, polyepoxide, polyaromatic, polysulfone, polyimide, silicone, protein or cellulosic polymer, or blend or copolymer thereof. In particular embodiments, the continuous layer, the distributed masses, or both components, can independently be made from a polyalkylene, polyurethane or silicone rubber.

Notwithstanding the above, the continuous layer 102 need not be particularly limited in its composition or structure and can be made from a solid or porous polymeric film, metal foil, porous foam, woven or non-woven fibrous layer, or combination thereof. If polymeric, the continuous layer 102 may be made from a thermoplastic or thermoset polymer. The continuous layer 102 preferably has sufficient strength and resilience for the distributed masses 106 to remain securely fastened within the acoustic article 100 for the desired application.

The continuous layer 102 can have an elastic modulus of from 500 MPa to 5000 MPa, from 900 MPa to 3000 MPa, from 1000 MPa to 2500 MPa, or in some embodiments, less than, equal to, or greater than, 500 MPa, 600, 700, 800, 900, 1000, 1100, 1200, 1300, 1400, 1500, 1600, 1700, 1800, 1900, 2000, 2100, 2200, 2300, 2400, or 2500 MPa. The distributed masses 106 can have an elastic modulus of from 0.1 MPa to 500 MPa, from 0.5 MPa to 300 MPa, from 1 MPa to 200 MPa, or in some embodiments, less than, equal to, or greater than, 0.1 MPa, 0.2, 0.3, 0.4, 0.5, 0.7, 1, 2, 5, 7, 10, 15, 20, 25, 30, 35, 40, 45, 50, 60, 70, 80, 90, 100, 110, 120, 150, 170, 200, 220, 250, 270, or 300 MPa.

Depending on the end-use application, the polymers may have glass transition temperatures (or $T_g$) of less than 250° C., 200° ° C., 150° ° C., 100° ° C., 50° C., 0° C., −50° C., or −100° C. Different glass transition temperatures may be chosen for the polymer of the continuous layer and the polymer of the masses.

Significant enhancement to the low frequency acoustic barrier performance of the acoustic article 100, such as below a frequency of 800 Hz, was observed when the elastic stiffness of the continuous layer 102 exceeds the elastic stiffness of the distributed masses. This is manifested by a shift in the anti-resonance peak resulting from vibration modes of the distributed masses towards lower frequencies. It was further discovered that this shift in the anti-resonance peak caused by reducing the elastic stiffness of the distributed masses (or conversely, increasing the elastic stiffness of the continuous layer) are only manifest when the stiffness of the distributed masses is less than that of the continuous layer. Optimal ranges for material properties can be affected by the dimensions of the acoustic article, given the interplay between the thickness of a component and its stiffness.

Elastic stiffness is a function of both thickness and elastic modulus, and the above condition can be reached by increasing the elastic modulus of the distributed masses 106 relative to that of the continuous layer 102, decreasing the thickness of the distributed masses 106 relative to that of the continuous layer 102, or some combination of both. For practical relative thickness dimensions for the distributed masses 106 and continuous layer 102, it can be advantageous for the elastic modulus of the continuous layer to exceed the elastic modulus of the plurality of distributed masses by a factor of from 1.1 to 50000, from 5 to 10000, from 10 to 1000, or in some embodiments, less than, equal to, or greater than 1.1, 1.2, 1.5, 2, 5, 10, 15, 20, 25, 30, 35, 40, 45, 50, 60, 70, 80, 90, 100, 200, 500, 1000, 2000, 5000, 10000, 15000, 20000, 30000, 40000, or 50000.

In various embodiments, the continuous layer 102 and distributed masses 106 can have significantly different densities. Useful embodiments can use distributed masses 106 having a first density and a continuous layer 102 having a second density, the first density being from 50 percent to 1000 percent, 80 percent to 500 percent, 100 percent to 300 percent, or in some embodiments, less than, equal to, or greater than 50 percent, 55, 60, 65, 70, 75, 80, 85, 90, 95, 100, 105, 110, 115, 120, 125, 130, 140, 150, 200, 250, 300, 350, 400, 450, 500, 600, 700, 800, 900, or 1000 percent of the second density.

Achieving a desired combination of stiffness and density of the continuous layer 102 relative to those of the distributed masses 106 can be realized at least in part by incorporating suitable fillers into the first polymer and/or second polymer comprising the continuous layer 102 and distributed masses 106, respectively. The inclusion of certain fillers can, for example, effectively increase or decrease elastic modulus of the first or second polymer relative to the respective polymer in its unfilled condition. The inclusion of fillers can also, for example, increase or decrease density of the first or second polymer relative to the respective polymer in its unfilled condition.

In a preferred embodiment, the first polymer contains a filler that increases the overall elastic modulus of the continuous layer. In the same or alternative embodiments, the first polymer contains a first filler that decreases the overall density of the continuous layer. Advantageously, selectively blending the first and/or second polymer with appropriate fillers can provide enhanced acoustic metamaterial properties in the acoustic article 100 even when the continuous layer 102 and distributed masses 106 are made from the same base polymer. In particular embodiments, the filler can be comprised of expandable microspheres, chemical blowing agents, glass, ceramic or polymeric bubbles. It is also possible to use a physical blowing agent including a gas such as nitrogen, carbon dioxide, or air.

Figure 3:
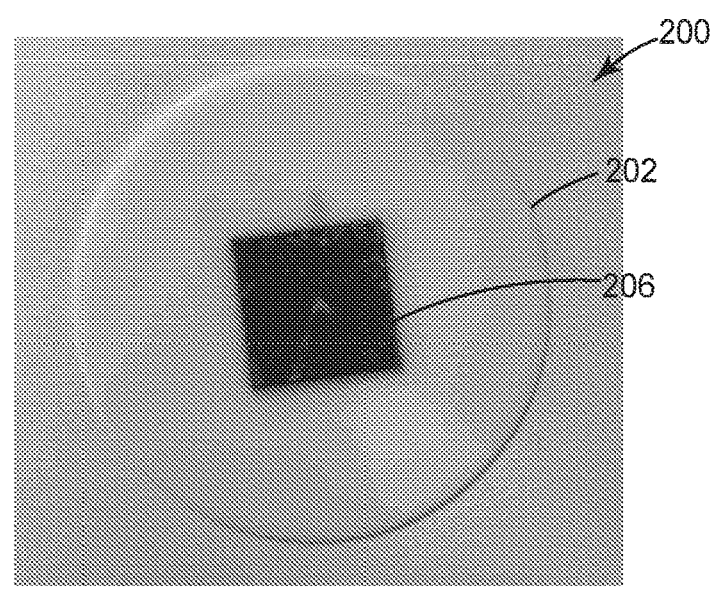
FIG. 3 is a photograph of an acoustic article prototype according to another exemplary embodiment.
Figure 4:
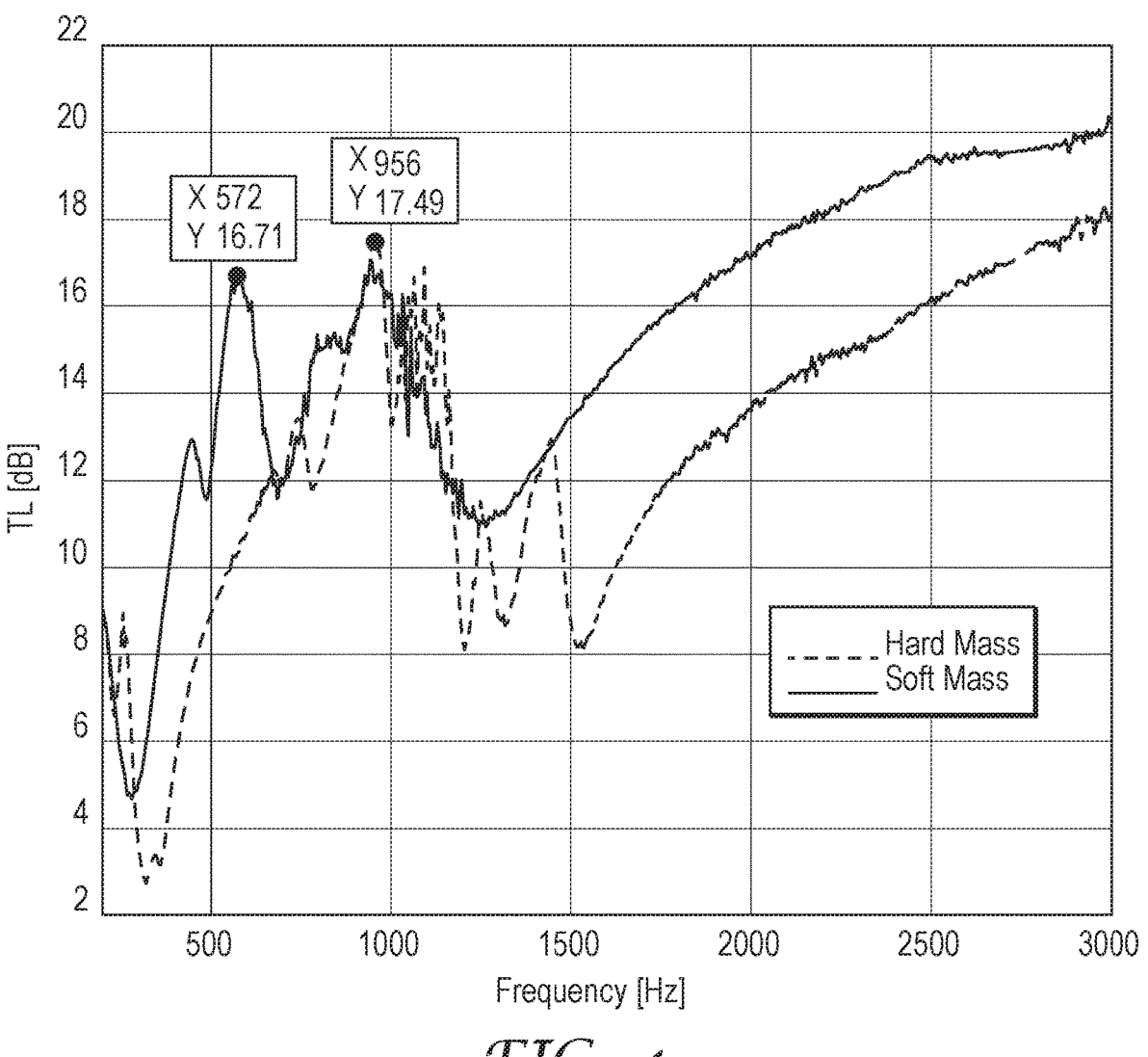
FIG. 4 is a transmission loss plot showing performance of the acoustic article prototype of FIG. 3.

FIG. 3 shows an actual prototype of an acoustic article 200 made using additive manufacturing, in which a relatively soft mass 206 is disposed on a relatively hard continuous layer 202. The acoustic performance characteristics are captured in the transmission loss measurement data in FIG. 4. These data show acoustic performance differences produced by two samples differing only in the elastic stiffnesses of their respective masses-0.5-1 MPa for a soft mass and 2-3 GPa for a hard mass. The soft and hard masses were each square and had a thickness of 1 millimeter and side length of 2 centimeters. The underlying continuous layer in each case was circular, having a diameter of 64 centimeters and thickness of 400 micrometers, and was fabricated from the same material as the soft mass.

Figure 5:
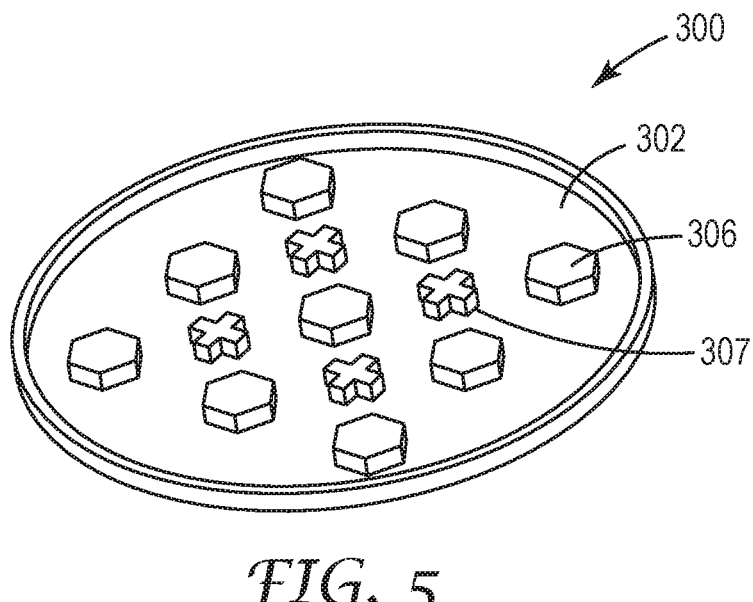
FIG. 5 is a perspective view of an acoustic article according to yet another exemplary embodiment.

FIG. 5 provides a fragmentary view of an acoustic article 300 according to another embodiment that includes two different sets of distributed masses, demonstrating that the masses need not have the same shape or size. As illustrated, this article 300 has a continuous layer 302 with a first set of masses 306 having a hexagonal shape in plan view and a second set of masses 307 that have cross shape in plan view. As demonstrated by this embodiment, the population of the masses 306, 307 need not be equal to each other, and the sets of masses 306, 307 can cover significantly different magnitudes of surface area.

Figure 6:
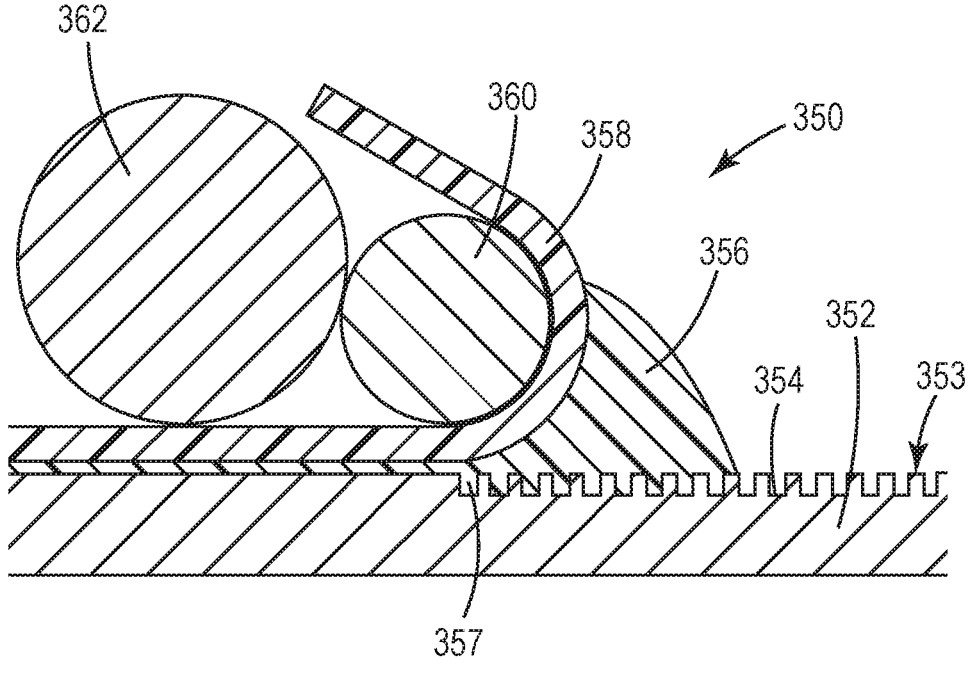
FIG. 6 is a cross-sectional view showing an exemplary method of making an acoustic article.

FIG. 6 illustrates a method 350 of making the foregoing acoustic articles using a structured surface, such as provided by a fabrication tool. Advantageously, this method and those subsequently described can be executed either in a batch process or in a scalable continuous manufacturing process.

The method 350 employs a tool 352 having a molding surface 353, which in turn includes plurality of defined recesses 354. The recesses 354 are replicated across a portion of the tool 352, with each recess 354 having a shape that is the inverse of the desired shape for the distributed masses. The recesses 354 shown have a generally rectangular shape, but any suitable moldable shape can be used.

The tool 352 can be made from any suitable material, inclusive of metals such as steel, aluminum and magnesium, as well as polymers such as silicone and polyurethane thermosets. Manufacture of the tool 352 is not particularly restricted, and can be accomplished using any of a variety of methods known in the art, including casting, embossing, milling, and additive manufacturing.

As shown, a rolling bank of a flowable composition 356 is applied and spread across the tool 352 by an overlayer 358. Assisting in spreading the overlayer 358 and composition 356 across the tool 352 are rollers 360, 362. In some embodiments, the pressure exerted by the rollers 360, 362 against the tool 352 can be adjustable to ensure the composition 356 substantially fills the recesses 354 in the tool 352. Preferably, the recesses 354 are completely filled by the composition 356 for optimal fidelity in the shapes and sizes of the distributed masses obtained therefrom.

Increasing the pressure applied by the rollers 360, 362 can also help press out excess composition 356 from areas above the molding surface, thereby adjusting the thickness of any excess composition 357 that does not enter the recesses 354. This excess composition 357 remains above the top of the molding surface 353 and need not be detrimental to the performance of the acoustic article. Upon hardening, an integral base layer interconnects the distributed masses to each other. It is generally preferred, although not critical, for the thickness of this base layer to be smaller than the depth of the recesses 354.

The composition 356 is generally a polymeric composition or reactive precursor thereof. For example, the composition 356 can be a molten thermoplastic polymer discharged from an extruder or other mixing device (not shown). Where a polymer melt is used, the tool 352 is generally made out of a metal that can withstand the temperatures of the molten polymer. Heat transfer to the tool 352 can also help facilitate subsequent hardening of the molten composition 356. Alternatively, the composition 356 can be a reactive mixture of one or more monomers, and often one or more initiators and/or catalysts, that is hardened through a polymerization (or curing) process after it is applied to the molding surface 353 of the tool 352. Curing processes are well known in the art. Depending on the nature of the initiators in the composition 356, curing can be initiated by actinic radiation, such as by exposure to ultraviolet or visible light, exposure to electron beam, or by heating the composition 356 to a suitable temperature.

The overlayer 358 represents a continuous layer that remains bonded to the composition 356 after hardening. The composition of the overlayer 358 is also not particularly restricted, although it is preferable that minimal or no damage or degradation of the overlayer 358 occurs as a result of the casting process described above. It is further preferable that the overlayer strongly adheres to the adjacent composition 356 after hardening.

In instances where the overlayer 358 is porous, mechanical retention can assist in enhancing interlayer adhesion with the hardened composition 356. Where the composition 356 is a molten thermoplastic, the overlayer 358 can be made from a metal foil, solid or porous polymeric film, porous foam, woven or non-woven fibrous layer, or combination thereof. Heat resistance and transmission of radiation through the overlayer 358 can be needed in some cases to preserve integrity of the overlayer 358 in layer assembly and ensure that proper hardening or curing occurs. More broadly, the composition of the overlayer 358 is not constrained to particular materials, and can include any of the compositions already described with respect to the continuous layer and distributed masses.

Figure 7:
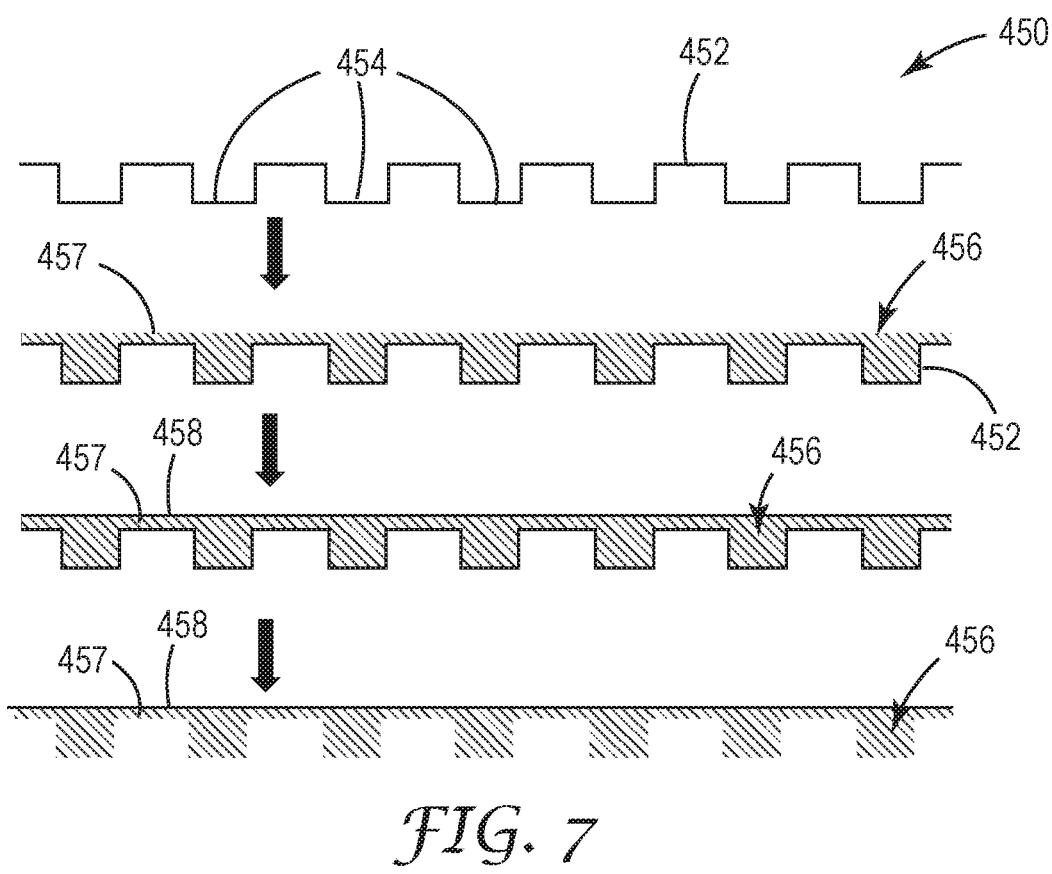
FIGS. 7 and 8 are schematic views showing different methods of making an acoustic article.

FIG. 7 shows a method 450 bearing many similarities to the earlier method 350, except the tool is replaced with a film 452 having a plurality of recesses 454 as shown. In this schematic diagram, a flowable composition 456 is applied to the film 452 such that the recesses 454 are filled. Optionally but not shown, a wiping step can be carried out to remove at least some excess composition 456 residing above the film 452. This wiping step can create a generally planar exposed major surface that is part of a thin base layer 457 integral with the discrete volumes of composition 456 contained within the recesses 454. The composition 456 is then hardened by cooling or curing as described previously.

As mentioned before, the presence of a thin base layer 457 was not determined to significantly degrade the anti-resonant properties of the overall acoustic article. Nonetheless, if desired, it is possible to remove the base layer 457 through one or more further steps. This could be achieved, for example, by a subtractive manufacturing step using a mechanical or chemical means, such as by abrasion, skiving, or reactive etching. Such a process step could provide an acoustic article in which the distributed masses obtained from hardening the composition 456 are entirely discrete—i.e., disconnected from each other.

In the next step, a continuous layer 458 is disposed onto the base layer 457, and then in a final step, the continuous layer 458 and hardened composition 456 are collectively removed from the film 452 to provide the finished acoustic article. In a variant to this method, it is also possible for the hardened composition 456 to be removed from the film 452 before the continuous layer 458 to be applied to the base layer 457. It is also possible for the removal of the film 452 to be omitted such that the film 452 remains part of the finished acoustic article. The film 452 and continuous layer 458 can independently be comprised of any of the compositions previously described for the overlayer 358.

The continuous layer 458 can be thermally or adhesively bonded to the composition 456. Where the composition 456 is not fully cured or hardened, it may be possible to enhance interlayer adhesion by laminating the overlayer while the composition 456 is only partially cured—i.e., before a full curing or hardening has taken place. The continuous layer 458 can be made by applying a reactive monomer mixture (which may be, for some embodiments, a second reactive monomer mixture) to the composition 456 and then curing this reactive monomer mixture to obtain the continuous layer.

Figure 8:
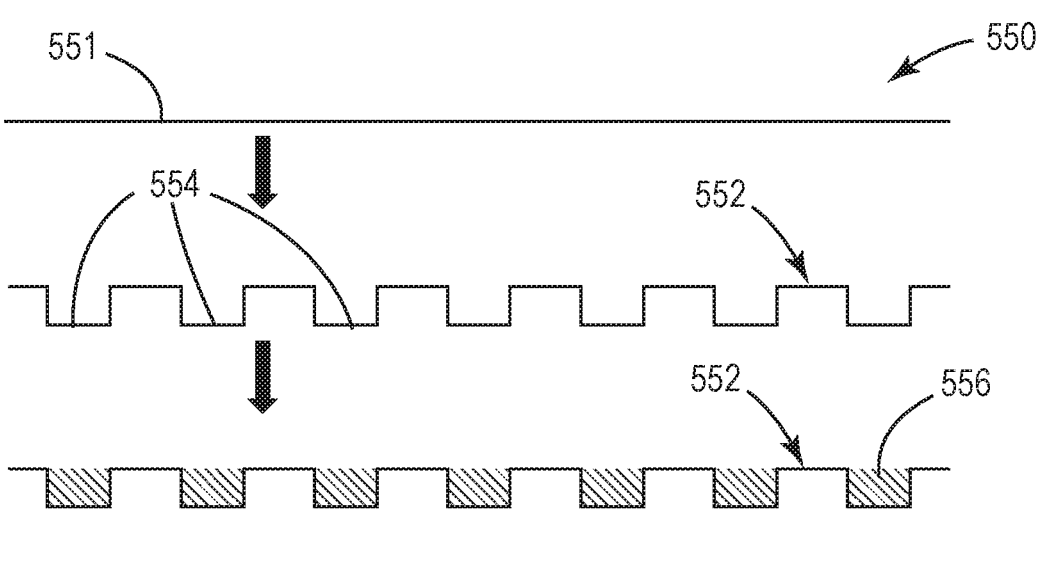

FIG. 8 shows a method 550 which bears similarities to method 450 in that it uses a film 552 having a molding surface with a plurality of recesses 554 to receive a composition 556. In this method, the film 552 is made by shaping a flat film 551. The shaping of the flat film 551 can be made by a thermal embossing process. Embossing, which is known in the art, can be carried out by heating a film made from a thermoplastic material above its glass transition temperature and then urging the heated film against a structured tool, which can also be heated. In a continuous process, the structured tool can take the form of a heated steel embossing roll and a molten web from an extrusion die may be substituted for a film that gets pre-heated. For this embodiment, the surface performing the embossing step will have the same topological features as those of the distributed masses of the acoustic article. The film 552 could also be a metal foil that is stamped to provide the recesses 554.

In the method depicted in FIG. 8, and unlike the method of FIG. 7, the film 552 remains as part of the acoustic article after the composition 556 applied to its molding surface and hardened to form distributed masses. The film 552 thus serves as a continuous layer that interconnects the distributed masses to each other, even though it has a non-planar shape that conforms to the outwardly protruding profile of the distributed masses rather than to the planar top surfaces of the distributed masses.

As a further option, but not shown here, a second continuous layer can be laminated or otherwise deposited onto the exposed top surface of the film 552 and exposed hardened composition 556 in a subsequent step. The second continuous layer would act in this case as a planar continuous layer that can encapsulates the distributed masses between the two films where such a configuration might be desirable. Such a configuration might be used, for example, where the hardened composition 556 needs protection from adverse environmental factors such as UV light, oxygen, and moisture in its intended application.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

TABLE 1

| Materials | | |
| --- | --- | --- |
| Designation | Description | Source |
| Heptane | Heptane | MilliporeSigma, St. Louis, MO. United States |
| P6210 | Aliphatic urethane acrylate oligomer available under the designation PHOTOMER 6210 | IGM Resins, St. Charles, IL. United States |
| SR238 | A photocurable resin available under the designation Hexane-1,6-Diol Diacrylate | Arkema, Exton, PA. United States |
| TPO | 2,4,6-Trimethylbenzoyldiphenylphosphine oxide photoinitiator available under the designation LUCIRIN TPO | BASF Corporation, Ludwigshafen, Germany |
| UV9300 | An epoxide-functional polydimethylsiloxane copolymer available under the trade designation "SILFORCE UV9300" | Momentive Performance Materials, Inc, Waterford, NY. United States |
| UV9380C | A photoactive Iodonium salt solution available under the trade designation "SILFORCE UV9380C" | Momentive Performance Materials, Inc |

Test Methods

Airborne Sound Transmission Loss

The methods of ASTM E90-09 (2016) were followed with minor modification. A 1.2 m×1.2 m (3.94 feet×3.94 feet) opening between the reverberant room and the detection room was reduced with 5.08 cm×10.16 cm (2-inch×4-inch) framing and 1.59 cm (0.625-inch) thick drywall to be 64.77 cm×66.04 cm (25.5-inch×26-inch). The sample was trimmed and sealed to prevent leaks. Transmission loss TL (dB) was measured.

Normal Incidence Determination of Porous Material Acoustical Properties Test

The methods of ASTM E2611-19 were followed. Normal incidence transmission loss $TL_n$ (dB) was measured.

Example 1

Step 1: Tool Fabrication

A 0.635 cm (0.25-inch) thick, 71.12 cm×71.12 cm (28-inch×28-inch) magnesium printing plate was fabricated by St. Cloud Engraving of St. Cloud, MN. 13.5 mm×13.5 mm (0.53-inch×0.53-inch) unit cells were placed 9 mm (0.35-inch) apart rotated at 45 degrees. The depth of an etch was 0.99 mm (0.039-inch).

10 grams of UV9300, 0.2 grams of UVC9380C, and 45 mL of Heptane were mixed in a 118.29 mL (4-ounce) amber glass bottle. 20 mL of the UV9300/UV9380C/Heptane solution was added to another amber glass bottle containing 100 mL of Heptane. The solution was poured into a 250-mL (8.45-ounce) Aldrich flask type sprayer (obtained from Sigma-Aldrich of St. Louis, MO. United States). The plate was coated with the solution using nitrogen as the sprayer propellant. After drying, the coating was UV cured using a RC-600 Pulse 500-watt UV curing system (obtain from Xenon Corporation of Wilmington, MA. United States). After UV curing, the plate was placed into oven heated to 80 degrees Celsius. After twenty minutes, the plate was removed from the oven and allowed to cool.

Step 2: Replication

A resin was created by blending P6210, SR238, and TPO in a 75/25/0.5 weight ratio. The tool (created in Step 1) was centered and placed onto a 60.96 cm×121.92 cm (24-inch× 48-inch) electrically heated hotplate. The hotplate was heated to 65° C. (150° F.) which heated the tool to about 54.4° C. (130° F.). The leading edge of a IUPILON 75-micrometer, 72.39 cm×83.82 cm (28.5-inch×33-inch) high haze polycarbonate film (with olefin premask side up) obtained from Mitsubishi Chemical of Tokyo, Japan was taped down about 1.27 cm (½-inch) from the edge of the tool. A 1-meter ½-inch diameter aluminum roller (identified as 360 in FIG. 6) and a 1-meter 1½-inch steel roller (identified as 362 in FIG. 6) were placed on the film where it was adhered to the tool. The film was then folded back over the metal rollers. A bead of resin was poured onto the tool that engulfed the first row of cavities. The steel roller was manually turned which slowly advanced the aluminum roller filling the cavities and laminating the film to the tool. Additional resin was added as needed. After the lamination was completed, the steel roller was moved back to its starting position and re-rolled across the laminated tool to minimize the resin thickness.

The resin was cured using a Firepower FP501 300X20 WC395 (20 W/cm$^2$ at 395 nm) LED system with a 30.48 cm (12-inch) window obtained from Phoseon Technology of Hillsboro, OR. United States. The cured resin adhered to the film and the composite film easily released from the treated tool surface.

Step 3: Evaluation:

Airborne Sound Transmission Loss testing was conducted, and the results are represented in Table 2.

TABLE 2

| Airborne Sound Transmission Loss Results | |
| --- | --- |
| Frequency (Hz) | TL (dB) |
| 100 | 4.87 |
| 125 | 1.60 |
| 160 | 5.50 |
| 200 | 5.67 |
| 250 | 6.98 |
| 315 | 6.99 |
| 400 | 6.90 |
| 500 | 5.26 |
| 630 | 7.51 |
| 800 | 8.90 |
| 1000 | 10.36 |
| 1250 | 12.52 |
| 1600 | 14.54 |
| 2000 | 16.53 |
| 2500 | 18.62 |
| 3150 | 21.23 |
| 4000 | 22.25 |
| 5000 | 18.27 |
| 6300 | 18.21 |
| 8000 | 21.14 |
| 10000 | 23.80 |

Example 2

Step 1: 3D Printing Fabrication

A resin was created as described in Preparative Example 3 of commonly assigned International Patent Application No. 2020/003133 (Mac Murray et al). The resin was used in combination with a ProMaker LD10 3D Printer obtained from Prodways Tech of Merrimack, NH. United States to create a 3D printed sample. A PET film was secured to the LD10 granite build platform with double-sided tape prior to printing and a layer height of 100 micrometers was used. The printer used 385 nm light to solidify the resin in a printed pattern represented in FIG. 5. Before printing, the printed pattern, for the sample, was modeled using SOLID-WORKS CAD software of Waltham, MA. United States.

After printing, the sample was rinsed in a bath of propylene carbonate and then isopropyl alcohol for one minute each. The sample was dried with blown air and post-cured for thirty minutes in a CA3200 UV chamber obtained from Clearstone Technologies Inc of Hopkins, MN. United States under a nitrogen purge using concurrently active 365, 385, and 405 nm light emitting diode (LEDs). Finally, the sample was heated in an oven at 100° C. for thirty minutes to reduce yellowing.

Step 2: Evaluation

Normal Incidence Determination of Porous Material Acoustical Properties testing with a 100 mm impedance tube was conducted, and the results are represented in Table 3.

TABLE 3

| Normal Incidence Determination of Porous Material Results | |
| --- | --- |
| Frequency (Hz) | TL$_n$ (dB) |
| 100 | 12.91 |
| 104 | 3.19 |
| 108 | 2.58 |
| 112 | 4.56 |
| 116 | 8.85 |
| 120 | 13.45 |
| 124 | 5.37 |
| 128 | 4.94 |
| 132 | 0.52 |
| 136 | 1.24 |
| 140 | 1.98 |
| 144 | 2.44 |
| 148 | 2.64 |
| 152 | 3.11 |
| 156 | 3.47 |
| 160 | 3.77 |
| 164 | 4.02 |
| 168 | 3.55 |
| 172 | 4.23 |
| 176 | 5.94 |
| 180 | 6.13 |
| 200 | 7.18 |
| 240 | 9.97 |
| 260 | 11.18 |
| 280 | 12.45 |
| 300 | 13.41 |
| 320 | 14.02 |
| 340 | 15.77 |
| 360 | 18.39 |
| 364 | 18.70 |
| 368 | 18.53 |
| 372 | 17.33 |
| 376 | 16.51 |
| 380 | 15.90 |
| 384 | 15.55 |
| 388 | 15.75 |
| 392 | 15.07 |
| 396 | 14.11 |
| 400 | 14.56 |
| 404 | 14.73 |

13

TABLE 3-continued

Normal Incidence Determination of Porous Material Results

| Frequency (Hz) | $TL_n$ (dB) |
|---|---|
| 408 | 15.20 |
| 412 | 15.62 |
| 416 | 15.82 |
| 420 | 16.16 |
| 424 | 16.33 |
| 428 | 16.72 |
| 432 | 17.39 |
| 436 | 17.85 |
| 440 | 17.97 |
| 460 | 17.28 |
| 480 | 19.24 |
| 500 | 21.86 |
| 520 | 21.58 |
| 540 | 19.22 |
| 560 | 19.73 |
| 580 | 18.68 |
| 600 | 20.71 |
| 620 | 20.61 |
| 640 | 15.91 |
| 660 | 17.22 |
| 680 | 19.74 |
| 700 | 18.81 |
| 720 | 18.92 |
| 740 | 21.25 |
| 760 | 23.67 |
| 780 | 23.03 |
| 800 | 22.50 |
| 820 | 23.49 |
| 840 | 21.06 |
| 860 | 16.78 |
| 880 | 18.34 |
| 900 | 20.97 |
| 920 | 22.88 |
| 940 | 24.68 |
| 960 | 24.82 |
| 980 | 23.30 |
| 1000 | 23.58 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An acoustic article comprising:
a continuous layer having a first elastic stiffness; and
a plurality of distributed masses disposed on a major surface of the continuous layer having a second elastic stiffness, wherein the second elastic stiffness is less than the first elastic stiffness, and
wherein the acoustic article is an acoustic metamaterial displaying an anti-resonance peak at a frequency below 800 Hz, and
wherein the continuous layer has an elastic modulus of from 500 MPa to 5000 MPa.

2. The acoustic article of claim 1, further comprising a base layer extending continuously over the major surface, the base layer being integral with the plurality of distributed masses.

3. The acoustic article of claim 1, wherein the plurality of distributed masses are arranged in a two-dimensional replicated pattern.

4. The acoustic article of claim 1, wherein the plurality of distributed masses are extending over from 5 percent to 80 percent of the overall area of the major surface.

5. The acoustic article of claim 1, wherein the plurality of distributed masses have an elastic modulus of from 0.1 MPa to 500 MPa.

6. The acoustic article of claim 1, wherein the elastic modulus of the continuous layer exceeds the elastic modulus of the plurality of distributed masses by a factor of from 1.1 to 50,000.

7. The acoustic article of claim 1, wherein the continuous layer comprises a first polymer that is a thermoset polymer.

8. The acoustic article of claim 7, wherein the continuous layer and/or the distributed masses comprises a polyalkylene, polyurethane or silicone rubber.

9. The acoustic article of claim 1, wherein the continuous layer comprises a first filler that increases the overall elastic modulus of the continuous layer.

10. The acoustic article of claim 1, wherein the continuous layer comprises a first filler that decreases the overall density of the continuous layer.

11. The acoustic article of claim 1, wherein the plurality of distributed masses contains a second filler that decreases the overall elastic modulus of the plurality of distributed masses.

12. The acoustic article of claim 1, wherein the second polymer contains a second filler that increases the overall density of the plurality of distributed masses.

13. The acoustic article of claim 1, wherein the continuous layer has a first thickness and the plurality of distributed masses have a second thickness, the first thickness being from 2.5 percent to 100 percent of the second thickness.

14. A method of making the acoustic article of claim 1, the method comprising:
providing a molding surface having a plurality of defined recesses;
applying to the molding surface a reactive monomer mixture that at least partially fills the plurality of defined recesses; and
disposing the continuous layer on the reactive monomer mixture;
removing at least some excess reactive monomer mixture between the continuous layer and the molding surface;
curing the reactive monomer mixture while it is contacting the continuous layer to couple the plurality of distributed masses to the continuous layer; and
optionally, removing the continuous layer and plurality of distributed masses from the molding surface.

15. The method of claim 14, further comprising embossing a flat film to provide the molding surface.

16. A method of making an acoustic article, the method comprising:
embossing a flat film to provide a molding surface comprising a plurality of defined recesses;
applying to the molding surface a reactive monomer mixture that at least partially fills the plurality of defined recesses;
removing at least some excess reactive monomer mixture above the molding surface; and
curing the reactive monomer mixture to obtain a plurality of distributed masses adhered to the molding surface.

17. An acoustic article made according to the method of claim 16.

18. An acoustic article comprising:
a continuous layer having a first elastic modulus; and
a plurality of distributed masses disposed on a major surface of the continuous layer having a second elastic modulus, wherein the second elastic modulus is less than the first elastic modulus, and wherein the acoustic article is an acoustic metamaterial displaying an anti-resonance peak at a frequency below 800 Hz, and wherein the continuous layer has an elastic modulus of from 500 MPa to 5000 MPa.

\* \* \* \* \*

16